Nov. 1, 1955     J. NIKOTA     2,722,078

PLURAL FISH HOOKS WITH AUTOMATIC RELEASE AND SPREAD

Filed Aug. 19, 1953

INVENTOR

JOHN NIKOTA

BY

ATTORNEY

United States Patent Office 2,722,078
Patented Nov. 1, 1955

2,722,078
PLURAL FISH HOOKS WITH AUTOMATIC RELEASE AND SPREAD

John Nikota, Windsor, Ontario, Canada

Application August 19, 1953, Serial No. 375,155

2 Claims. (Cl. 43—36)

This invention relates to improvements in fish hooks. It is an object of the invention to provide a fish hook including a resilient wire having a hook on each extremity and looped substantially centrally of its length, and a trigger member extending from the looped portion of the wire adapted to support the hooks in balance against opposite sides thereof, so that when the balance is disturbed, as by the strike of a fish, the hooks swing across one another past the trigger member.

Another object of the invention is to provide such a fish hook wherein the trigger member is resilient and adapted to swing along a path substantially at right angles to the paths of movement of the hooks upon release of the latter from the member to insure free movement of the hooks.

A further object of the invention is to provide such a fish hook wherein the hooks are, when set, so positioned against the trigger member as to minimize the possibility of their becoming tangled with weeds.

Having thus briefly stated some of the objects and advantages of the invention I will now describe it with the aid of the accompanying drawing, in which.

Figure 1:
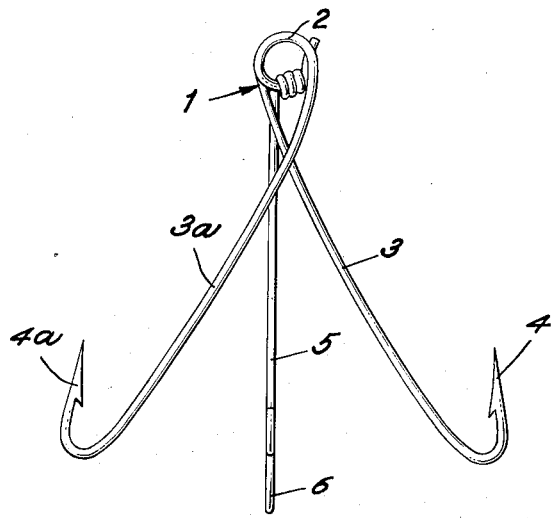
Figure 1 is a front view of the invention with the hooks released from the trigger member.

Referring to the drawing, 1 designates a resilient wire in which a loop 2 is formed substantially centrally of its length. The loop preferably consists of somewhat less than two turns, and the two wire portions 3 and 3a which extend from opposite ends thereof have hooks 4 and 4a, respectively, integral with their outer extremities. The wire portions 3 and 3a are flat and substantially straight from the loop 2 to their respective hooks 4 and 4a, and are so sprung that they tend to swing along parallel and adjacent paths into such positions that they cross one another adjacent the loop 2, as shown in Figure 1, at which time the hooks 4 and 4a are outwardly disposed and a material distance from one another.

Figure 2:
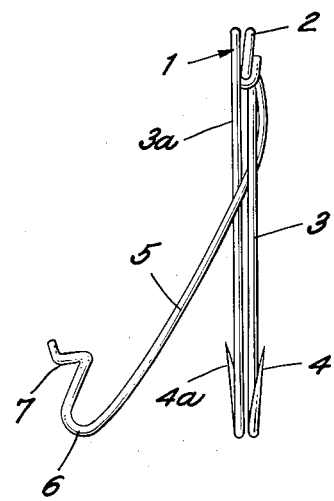
Figure 2 is a side view thereof.
Figure 4:
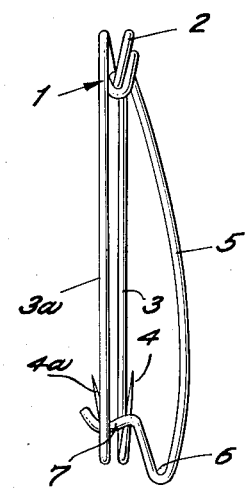
Figure 4 is a side view thereof.

Wound around, or otherwise suitably secured to, the loop 2 is the inner extremity of a resilient trigger member 5, preferably made of wire. The trigger member extends substantially radially from the loop 2 and is so sprung that it is adapted to swing substantially at right angles across the paths of movement of the two wire portions 3 and 3a, as shown in Figure 2. The trigger member, when under tension, is adapted to extend substantially parallel with, and to one side of, the wire portion 3 on the side of the latter remote from the wire portion 3a, as shown in Figure 4. Adjacent its outer extremity the member 5 is bent laterally and inwardly to form a substantially U-shaped loop 6 from which a short leg extends which terminates at the outer extremity of the member 5 in a concave seat 7.

Figure 3:
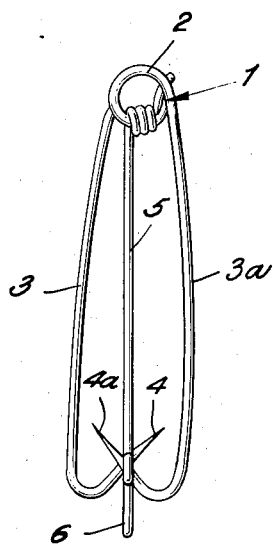
Figure 3 is a front view showing the hooks in engagement with the trigger member.
Figure 5:
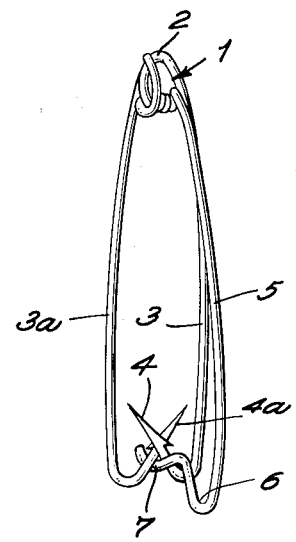
Figure 5 is a perspective view showing the hooks in set, or trigger engaging, position.

In order to engage the hooks 4 and 4a with the seat 7 the U-shaped loop 6 is held between the thumb and first finger of one hand so that the seat remains exposed. The wire portion 3 is pulled back against the tension of the wire and the outer face of the hook 4, adjacent its outer extremity, is placed against one side of the seat 7, and then the outer face of the other hook 4a is similarly placed against the opposite side of the seat. Thus the spring tension exerted by the wire portions 3 and 3a against opposite sides of the seat holds the two hooks and the trigger member in balanced engagement, as is most clearly seen in Figures 3 and 5. Obviously when a fish strikes and this balance is upset the hooks 4 and 4a swing toward their positions shown in Figure 1, and the trigger member 5 swings laterally between the wire portions 3 and 3a so as not to interfere with the free movement of the said portions or their hooks 4 and 4a.

While in the foregoing the preferred embodiment of the invention has been described and shown, it is understood that alterations and modifications may be made thereto provided the said alternations and modifications fall within the scope of the appended claims.

What I claim is:

1. A fish hook including a first elongated resilient wire having a resilient loop formed therein centrally of its length, the portions of the wire extending from the loop each terminating in a hook member in substantially the same general plane and said portions through the resiliency of the wire and loop being normally biased to a diverging relation from said loop with the hooks directed outwardly, a trigger member including a second elongated resilient wire having one end thereof secured to said loop, the opposite free end of said last resilient wire having a finger engageable U-shaped loop including a relatively short leg which terminates in a concave seat, one side of which constitutes the end portion of the wire and which provides a hook engageable camming member, the said last resilient wire being normally biased in a direction away from the general plane of the hook members, the said hook members adjacent the free ends thereof being receivable within said seat with each of said resilient wires under tension, whereby upon strike of a fish the said hook members exert pressure on said camming member with a resulting disconnection of the trigger member from the hook members for the purpose set forth.

2. The structure according to claim 1 wherein the connection of said second wire with said first wire comprises a coiled end on said second wire tightly engaged with said loop.

References Cited in the file of this patent

UNITED STATES PATENTS

| 1,156,795 | Mau | Oct. 12, 1915 |
| 1,649,140 | Steffens | Nov. 15, 1927 |
| 2,619,758 | Freire | Dec. 2, 1952 |